(12) United States Patent
Yue et al.

(10) Patent No.: US 7,542,046 B1
(45) Date of Patent: Jun. 2, 2009

(54) PROGRAMMABLE CLIPPING ENGINE FOR CLIPPING GRAPHICS PRIMITIVES

(75) Inventors: Lordson L. Yue, Foster City, CA (US); Vimal S. Parikh, Fremont, CA (US); Andrew J. Tao, San Francisco, CA (US)

(73) Assignee: Nvidia Corporation, Santa Clara, CA (US)

( * ) Notice: Subject to any disclaimer, the term of this patent is extended or adjusted under 35 U.S.C. 154(b) by 263 days.

(21) Appl. No.: 11/475,599

(22) Filed: Jun. 26, 2006

(51) Int. Cl.
*G06F 12/00* (2006.01)

(52) U.S. Cl. .................. 345/564; 345/531; 345/620

(58) Field of Classification Search .............. 345/522, 345/564; 711/159
See application file for complete search history.

(56) References Cited

U.S. PATENT DOCUMENTS

| | | | |
|---|---|---|---|
| 4,403,284 A | 9/1983 | Sacarisen et al. | |
| 5,390,311 A | 2/1995 | Fu et al. | |
| 6,864,893 B2 | 3/2005 | Zatz | |
| 6,900,810 B1 * | 5/2005 | Moreton et al. | 345/522 |
| 6,940,515 B1 | 9/2005 | Moreton et al. | |
| 7,039,776 B2 * | 5/2006 | Wong et al. | 711/159 |
| 7,215,344 B2 * | 5/2007 | Baldwin | 345/620 |
| 2005/0253861 A1 | 11/2005 | Hutchins et al. | |
| 2006/0050077 A1 | 3/2006 | D'Amora et al. | |

OTHER PUBLICATIONS

"Microprogram" http://en.wikipedia.org/wiki/Microcode, Feb. 22, 2006.

* cited by examiner

*Primary Examiner*—Xiao M Wu
*Assistant Examiner*—Phi Hoang
(74) *Attorney, Agent, or Firm*—Cooley Godward Kronish LLP

(57) ABSTRACT

An apparatus, system, and method for clipping graphics primitives are described. In one embodiment, a graphics processing apparatus includes a clipping unit, a read-only memory that is connected to the clipping unit, a read-write memory that is connected to the clipping unit, and an addressing unit that is connected to the read-only memory and the read-write memory. The read-only memory is configured to store a clipping program, and the read-write memory is configured to store a patch program. The addressing unit is configured to selectively address one of the read-only memory and the read-write memory based on a set of input conditions.

19 Claims, 2 Drawing Sheets

PROGRAMMABLE CLIPPING ENGINE FOR CLIPPING GRAPHICS PRIMITIVES

BRIEF DESCRIPTION OF THE INVENTION

The invention relates generally to graphics processing. More particularly, the invention relates to an apparatus, system, and method for clipping graphics primitives using a programmable clipping engine.

BACKGROUND OF THE INVENTION

Conventional graphics processing systems sometimes implement techniques for clipping graphics primitives. Clipping typically refers to a set of operations that determine which portion of a graphics primitive is to be displayed with respect to a set of clipping planes. Various techniques have been developed for clipping graphics primitives. Examples of these techniques include the Cohen-Sutherland technique, the Liang-Barsky technique, the Sutherland-Hodgeman technique, and the Weiler technique. Of these techniques, the Sutherland-Hodgeman technique is perhaps the most commonly used.

Conventional clipping techniques are sometimes implemented using micro-code, such that a clipping program specifies a sequence of clipping operations to be performed. For reasons related to memory access latency, power consumption, and die area size, the clipping program is typically stored in a Read-Only Memory ("ROM"). A significant drawback of such micro-coded implementation is that, once fabricated, contents of the ROM and, thus, clipping functionality cannot be readily modified or supplemented. As a result of this drawback, the use of the ROM can impede the ability to fix bugs that might be present in the clipping program. In addition, the use of the ROM can impede the ability to add functional enhancements that might be desirable from time to time, such as to provide performance optimizations or to account for evolving performance requirements.

It is against this background that a need arose to develop the apparatus, system, and method described herein.

SUMMARY OF THE INVENTION

In one aspect, the invention relates to a graphics processing apparatus. In one embodiment, the graphics processing apparatus includes a clipping unit, a ROM that is connected to the clipping unit, a Read-Write Memory ("RWM") that is connected to the clipping unit, and an addressing unit that is connected to the ROM and the RWM. The ROM is configured to store a clipping program, and the RWM is configured to store a patch program. The addressing unit is configured to selectively address one of the ROM and the RWM based on a set of input conditions.

In another embodiment, the graphics processing apparatus includes a programmable clipping engine that is configured to clip a graphics primitive. The programmable clipping engine includes a clipping unit, a first instruction memory that is connected to the clipping unit, a second instruction memory that is connected to the clipping unit, and an addressing unit that is connected to the first instruction memory and the second instruction memory. The second instruction memory is writable, and the addressing unit is configured to select between the first instruction memory and the second instruction memory.

In another aspect, the invention relates to a graphics processing method. In one embodiment, the graphics processing method includes providing a programmable clipping engine including a clipping unit, a ROM storing a first set of instructions, and a RWM storing a second set of instructions. The graphics processing method also includes, based on a set of characteristics of a graphics primitive to be clipped, selecting the second set of instructions for execution by the clipping unit. The graphics processing method further includes, using the clipping unit, executing the second set of instructions to clip the graphics primitive.

Advantageously, certain embodiments of the invention provide an improved clipping engine for clipping graphics primitives. In particular, the clipping engine can be programmable, such that clipping functionality can be readily modified or supplemented subsequent to fabrication. As a result, the clipping engine can provide the ability to fix bugs that might be present in a clipping program. In addition, the clipping engine can provide the ability to add functional enhancements that might be desirable from time to time, such as to provide performance optimizations or to account for evolving performance requirements.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings, in which.

Like reference numerals are used to refer to corresponding components of the drawings.

DETAILED DESCRIPTION

Figure 1:
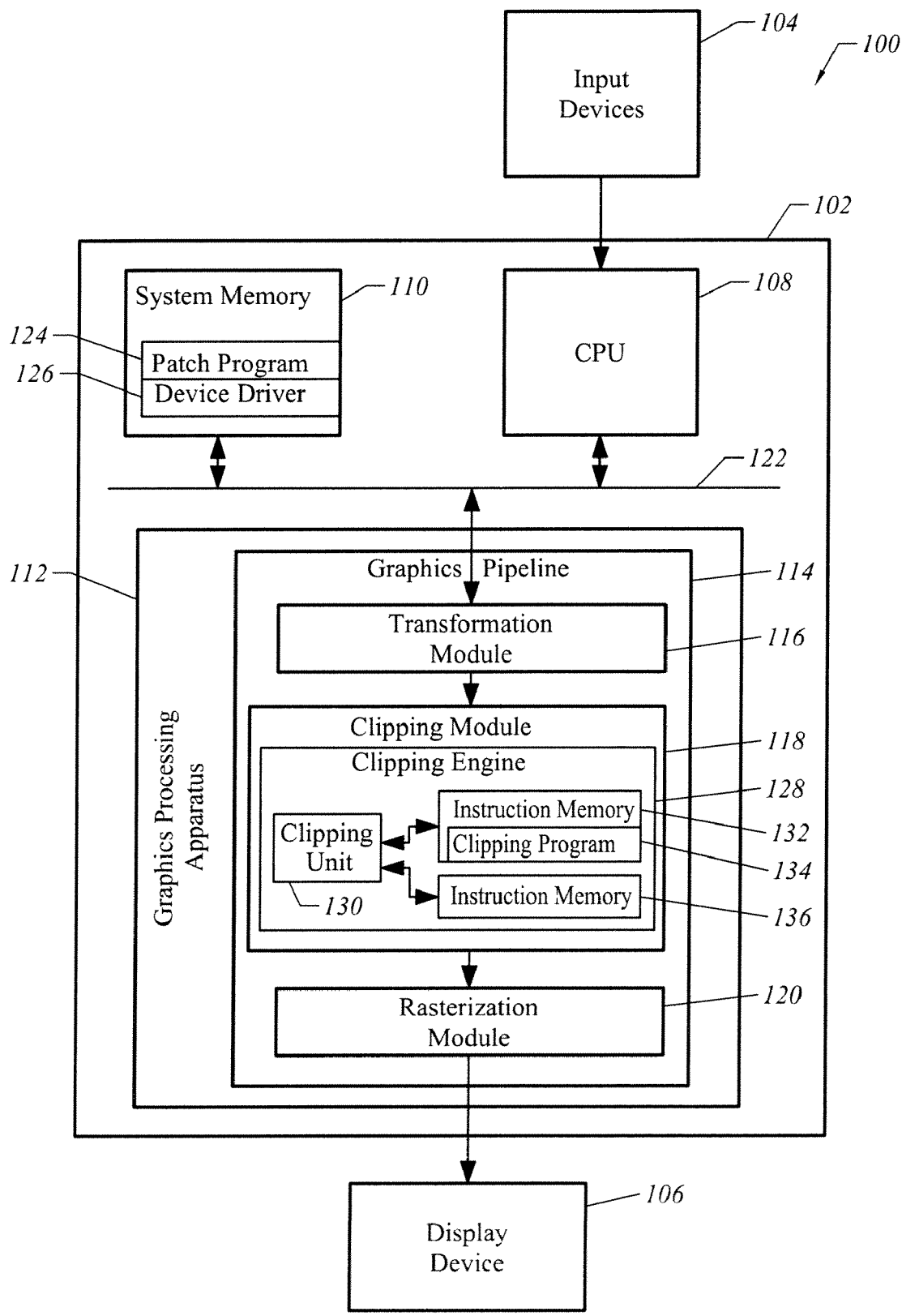
FIG. 1 illustrates a computer system that is implemented in accordance with an embodiment of the invention.

FIG. 1 illustrates a computer system 100 that is implemented in accordance with an embodiment of the invention. The computer system 100 includes a computer 102, which can be, for example, a desktop computer, a server computer, a laptop computer, a palm-sized computer, a tablet computer, a game console, a portable wireless terminal such as a personal digital assistant or a cellular telephone, a computer-based simulator, or any other device with data processing capability. As illustrated in FIG. 1, the computer 102 is connected to a set of one or more input devices 104, which can include, for example, a keyboard and a mouse. The computer 102 is also connected to a display device 106, which can be, for example, a television set, a Cathode Ray Tube ("CRT") monitor, or a Liquid Crystal Display ("LCD") monitor.

The computer 102 includes a Central Processing Unit ("CPU") 108, which is connected to a system memory 110 over a bus 122. Referring to FIG. 1, the system memory 110 stores a patch program 124 and a device driver 126, which are further described below. The system memory 110 can be implemented using, for example, a ROM and a Random Access Memory ("RAM"). As illustrated in FIG. 1, the computer 102 also includes a graphics processing apparatus 112 that is connected to the CPU 108 and the system memory 110 over the bus 122. The graphics processing apparatus 112 can be, for example, a Graphics Processing Unit ("GPU").

In the illustrated embodiment, the graphics processing apparatus 112 performs a number of operations to display an object using the display device 106. Referring to FIG. 1, the graphics processing apparatus 112 includes a graphics pipeline 114, which includes a number of modules that are connected to one another and that form different stages of the graphics pipeline 114. In particular, the graphics pipeline 114 includes a transformation module 116, a clipping module 118, and a rasterization module 120. While three modules are illustrated in FIG. 1, it is contemplated that the graphics pipeline 114 can include more or less modules depending on the particular implementation. It is also contemplated that these modules can be combined, sub-divided, or re-ordered for another implementation.

As illustrated in FIG. 1, the transformation module 116 receives a set of graphics primitives that represent the object to be displayed. Examples of the graphics primitives include one-dimensional graphics primitives, such as lines, and two-dimensional graphics primitives, such as polygons. Referring to FIG. 1, the transformation module 116 performs a number of transformation operations on the graphics primitives. For example, coordinate data of vertices defining the graphics primitives can be rotated, scaled, translated, or converted from one coordinate space into another coordinate space. It is also contemplated that color data, specularity data, or texture data of the vertices can be modified, such as in connection with lighting operations. The transformation module 116 then delivers the graphics primitives that have been transformed in such manner to the clipping module 118.

Referring to FIG. 1, the clipping module 118 next clips the graphics primitives with respect to a set of clipping planes to produce clipped graphics primitives. The clipping module 118 then delivers the clipped graphics primitives to the rasterization module 120. In the illustrated embodiment, the clipping planes define a viewing region, which can be a two-dimensional viewing area or a three-dimensional viewing volume. It is also contemplated that the clipping planes can alternatively, or in conjunction, include a set of model clipping planes, which can be specified by a user to further restrict the viewing region or to remove certain portions of the object from view. The clipping module 118 serves to increase efficiency of the graphics pipeline 114, as further processing on portions of the object that lie outside of the viewing region need not be performed. Also, by using the set of model clipping planes, the clipping module 118 allows portions of the object that were previously hidden from view to be visualized.

In the illustrated embodiment, the clipping module 118 includes a clipping engine 128, which performs a number of clipping operations on the graphics primitives to produce the clipped graphics primitives. As illustrated in FIG. 1, the clipping engine 128 is implemented as a micro-coded engine and includes a clipping unit 130 and an instruction memory 132 that is connected to the clipping unit 130. The instruction memory 132 stores a clipping program 134, which specifies a sequence of clipping operations to be performed by the clipping unit 130. Referring to FIG. 1, the instruction memory 132 is implemented using a substantially non-writable memory, such as a ROM. As can be appreciated, the use of a ROM can be desirable since it has a reduced memory access latency, a reduced power consumption, and a reduced die area size as compared with certain types of writable memory.

Certain features of the clipping engine 128 described up to this point are conventional. However, unlike a conventional micro-coded implementation, the clipping engine 128 is fully programmable, such that clipping functionality can be readily modified or supplemented subsequent to fabrication of the clipping engine 128. In the illustrated embodiment, such programmability is achieved by supplementing the clipping engine 128 with an instruction memory 136, which is connected to the clipping unit 130. Advantageously, the instruction memory 136 is implemented using a writable memory, such that the patch program 124 can be written into the instruction memory 136 to specify an additional or alternate sequence of clipping operations to be performed by the clipping unit 130. For example, the instruction memory 136 can be implemented using a RWM, such as a RAM, and the patch program 124 can be written into the instruction memory 136 so as to effectively replace a portion of the clipping program 134 or to add functionality to the clipping program 134. In such manner, the use of the instruction memory 136 provides the ability to fix bugs that might be present in the clipping program 134 as well as the ability to add functional enhancements that might be desirable from time to time. During operation, the clipping engine 128 selects between the instruction memory 132 and the instruction memory 136, such that clipping of the graphics primitives can be performed in accordance with either of, or both, the clipping program 134 and the patch program 124.

Depending on a size of the instruction memory 136, the patch program 124 can provide a relatively limited functionality, such as via a small sub-routine, a moderately complex functionality, such as via multiple, interrelated sub-routines, or a relatively complex functionality, such as via an additional or alternate clipping program to implement a different clipping technique. Coding of the patch program 124 can be performed locally or remotely using, for example, an assembler or a compiler (not illustrated in FIG. 1). In the illustrated embodiment, the device driver 126 coordinates writing of the patch program 124 into the instruction memory 136. In particular, the device driver 126 directs loading of the patch program 124 into the instruction memory 136 upon initialization of the clipping engine 128. In some instances, loading of the patch program 124 can be performed on an "as needed" basis, such that additional clock cycles for accessing the instruction memory 136 need not be spent unless the patch program 124 is actually required.

As illustrated in FIG. 1, the rasterization module 120 next performs a number of interpolation operations on the clipped graphics primitives to produce a set of pixels that represent the object to be displayed. For example, coordinate data of vertices defining the clipped graphics primitives can be interpolated to assign the pixels to represent the object. It is also contemplated that color data, specularity data, or texture data of the vertices can be interpolated in connection with pixel assignment. The rasterization module 120 then delivers the pixels for display using the display device 106.

The foregoing provides an overview of an embodiment of the invention. Attention next turns to FIG. 2, which illustrates the clipping engine 128 that is implemented in accordance with an embodiment of the invention. The clipping engine 128 includes the clipping unit 130, which executes a sequence of instructions to clip a graphics primitive with respect to a set of clipping planes. The clipping unit 130 can be implemented using, for example, a computational unit that performs various operations, such as additions, compares, multiplications, reciprocals, and subtractions.

Figure 2:
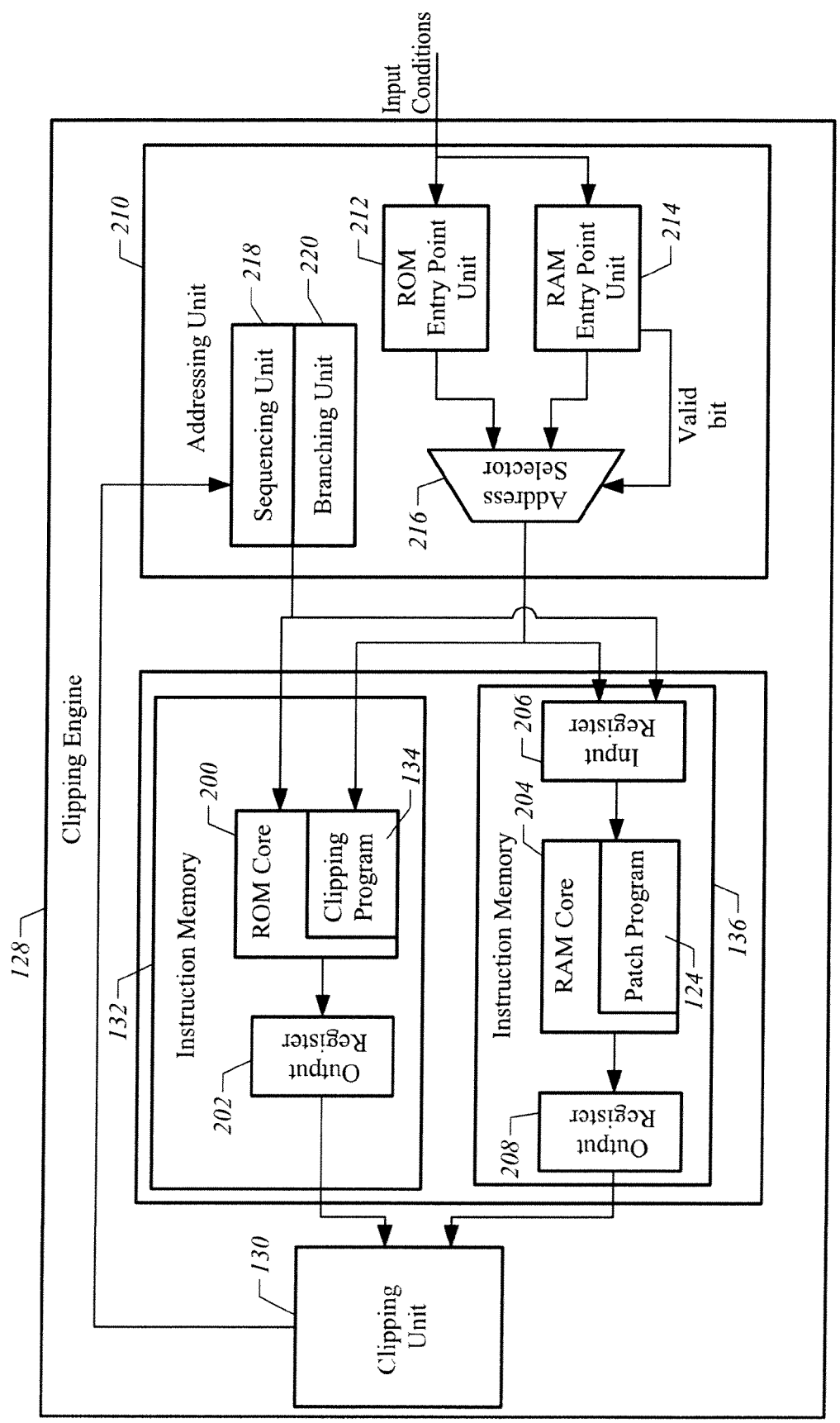
FIG. 2 illustrates a clipping engine that is implemented in accordance with an embodiment of the invention.

Referring to FIG. 2, the clipping engine 128 also includes the instruction memory 132 and the instruction memory 136, which are connected to the clipping unit 130. As previously described, the instruction memory 132 is implemented using a substantially non-writable memory that stores the clipping program 134, while the instruction memory 136 is implemented using a writable memory that stores the patch program 124. In such manner, the clipping program 134 can be stored in a relatively fixed format in the instruction memory 132, while the patch program 124 can be dynamically loaded into the instruction memory 136 and executed in place of, or in conjunction with, the clipping program 134. Depending on a desired balance between programmability considerations on the one hand and memory access latency, power consumption, and die area considerations on the other hand, the instruction memory 136 will typically have a memory size that is the same as or smaller than that of the instruction memory 132. However, it is contemplated that the instruction memory 136 can have a larger memory size or can be used in place of the instruction memory 132 for another implementation.

In the illustrated embodiment, the instruction memory 132 and the instruction memory 136 are implemented so as to appear as a single instruction memory. In particular, the instruction memory 132 and the instruction memory 136 are assigned respective address spaces so as to define a combined address space that is contiguous and linear. For example, the instruction memory 132 can be assigned a lower address space within the combined address space, such as addresses 0 to 255, while the instruction memory 136 can be assigned an upper address space within the combined address space, such as addresses 256 to 511.

Referring to FIG. 2, the instruction memory 132 includes a ROM core 200 and an output register 202 that is connected to the ROM core 200, while the instruction memory 136 includes a RAM core 204, an input register 206 that is connected to the RAM core 204, and an output register 208 that is connected to the RAM core 204. The input register 206 and the output registers 202 and 208 are included so as to adjust timing in connection with branching, which is further described below. As illustrated in FIG. 2, a memory access latency of the instruction memory 132 is about 1 clock cycle from address in to instruction out, while a memory access latency of the instruction memory 136 is about 2 clock cycles from address in to instruction out. Stated in another way, it takes about 1 clock cycle from when an input address is delivered to the ROM core 200 to when an instruction stored at that input address is issued from the output register 202. On the other hand, with respect to the instruction memory 136, it takes about 2 clock cycles from when an input address is delivered to the input register 206 to when an instruction stored at that input address is issued from the output register 208.

As illustrated in FIG. 2, the clipping engine 128 also includes an addressing unit 210 that is connected to the clipping unit 130, the instruction memory 132, and the instruction memory 136. The addressing unit 210 coordinates access to the instruction memory 132 and the instruction memory 136, such that an appropriate sequence of instructions is delivered to the clipping unit 130 for execution. Referring to FIG. 2, the addressing unit 210 includes a ROM entry point unit 212, a RAM entry point unit 214, and an address selector 216. The address selector 216 is connected to the ROM entry point unit 212 and the RAM entry point unit 214 at an input end and to the instruction memory 132 and the instruction memory 136 at an output end. In the illustrated embodiment, the ROM entry point unit 212, the RAM entry point unit 214, and the address selector 216 operate in conjunction to selectively address the instruction memory 132 or the instruction memory 136, such that the clipping unit 130 begins execution in accordance with either the clipping program 134 or the patch program 124. Selection between the instruction memory 132 and the instruction memory 136 is performed in accordance with a set of input conditions, which serves to indicate whether execution should proceed using the clipping program 134 or the patch program 124. In some instances, the input conditions can be related to a set of characteristics of the graphics primitive to be clipped, such as whether the graphics primitive is a one-dimensional graphics primitive or a two-dimensional graphics primitive. Alternatively, or in conjunction, the input conditions can be related to a set of characteristics of the clipping planes, such as whether the clipping planes define a viewing region or correspond to a set of model clipping planes.

During operation, the ROM entry point unit 212 issues a first entry point address into the instruction memory 132, while the RAM entry point unit 214 issues a second entry point address into the instruction memory 136. For example, the first entry point address can be within addresses 0 to 255, while the second entry point address can be within addresses 256 to 511. In this example, the first entry point address and the second entry point address can be represented as 9-bit words that are distinguishable based on their most significant bits. The ROM entry point unit 212 can be implemented using, for example, a ROM that stores a first entry point table including t entries, and the input conditions can be used to locate a particular one of the t entries that includes the first entry point address. The RAM entry point unit 214 can be implemented using, for example, a RAM or a set of registers that stores a second entry point table including t entries, and the input conditions can be used to locate a particular one of the t entries that includes the second entry point address as well as a valid bit. Next, the address selector 216 selects either the first entry point address or the second entry point address, such that execution begins in accordance with either the clipping program 134 or the patch program 124. The address selector 216 can be implemented using, for example, a multiplexer that selects between the first entry point address and the second entry point address based on the valid bit.

Referring to FIG. 2, the addressing unit 210 further includes a sequencing unit 218 and a branching unit 220, which are connected to the clipping unit 130, the instruction memory 132, and the instruction memory 136. During execution of either the clipping program 134 or the patch program 124, the sequencing unit 218 issues a sequence of addresses to step through that program. In the event that a branch instruction is encountered, the branching unit 220 coordinates branching, which can occur within the clipping program 134, within the patch program 124, or between the clipping program 134 and the patch program 124. Indeed, the branching unit 220 allows branching between the clipping program 134 and the patch program 124 to occur seamlessly, even though the instruction memory 132 and the instruction memory 136 have different memory access latencies. As further described below, by recognizing whether branching occurs within the instruction memory 132, within the instruction memory 136; or between the instruction memory 132 and the instruction memory 136, the branching unit 220 coordinates branching so as to avoid or reduce branching penalties, such as in the form of instruction or pipeline bubbles. The sequencing unit 218 and the branching unit 220 can be implemented in any suitable manner, such as using computer code, hardwired circuitry, or a combination of computer code and hardwired circuitry.

The operation of the sequencing unit 218 and the branching unit 220 can be further understood with reference to Table 1 through Table 3, which set forth various operational scenarios of the clipping engine 128 in accordance with an embodiment of the invention. In particular, Table 1 sets forth one operational scenario in which various instructions stored in the instruction memory 132 are read out for execution by the clipping unit 130. As a result of the memory access latency of the instruction memory 132, instr[4], which specifies a branch to address 10, does not take effect until 2 clock cycles after address 4 is delivered to the instruction memory 132. To fill a gap prior to instr[4] taking effect, a delayed branching technique is implemented, such that an instruction immediately following instr[4] is addressed and read out. Here, instr[5] is used to fill the gap, and can be discarded either prior to or subsequent to execution.

TABLE 1

| Clock Cycle | Address In | Instruction Out |
|---|---|---|
| 0 | 0 | |
| 1 | 1 | instr[0] |
| 2 | 2 | instr[1] |
| 3 | 3 | instr[2] |
| 4 | 4 | instr[3] |
| 5 | 5 | instr[4] - branch to address 10 |
| 6 | 10 | instr[5] |
| 7 | 11 | instr[10] |
| 8 | 12 | instr[11] |
| 9 | | instr[12] |

Table 2 sets forth another operational scenario in which various instructions stored in the instruction memory 136 are read out for execution by the clipping unit 130. As a result of the memory access latency of the instruction memory 136, instr[260], which specifies a branch to address 266, does not take effect until 2 clock cycles after address 260 is delivered to the instruction memory 136. Again, to fill a gap prior to instr[266] taking effect, a delayed branching technique is implemented, such that instr[261] is addressed and read out. To account for the greater memory access latency of the instruction memory 136, an input address is reset to address 266 substantially immediately upon instr[260] taking effect. Such resetting can be performed, since the instruction memory 136 includes the input register 206.

TABLE 2

| Clock Cycle | Address In | Instruction Out |
|---|---|---|
| 0 | 256 | |
| 1 | 257 | |
| 2 | 258 | instr[256] |
| 3 | 259 | instr[257] |
| 4 | 260 | instr[258] |
| 5 | 261 | instr[259] |
| 6 | 266 | instr[260] - branch to address 266 |
| 7 | 267 | instr[261] |
| 8 | 268 | instr[266] |
| 9 | | instr[267] |
| 10 | | instr[268] |

Table 3 sets forth a further operational scenario in which various instructions stored in the instruction memory 132 are initially read out for execution by the clipping unit 130. As described in connection with Table 1, instr[4], which specifies a branch to address 10, does not take effect until 2 clock cycles later. Again, to fill a gap prior to instr[4] taking effect, a delayed branching technique is implemented, such that instr[5] is addressed and read out. Here, however, instr[11] next specifies a branch to address 256, which is within the address space assigned to the instruction memory 136. To fill a gap prior to instr[11] taking effect, a delayed branching technique is implemented, such that instr[12] is addressed and read out. In addition, to account for the greater memory access latency of the instruction memory 136, its input address is reset to address 256 substantially immediately upon instr[11] taking effect. Next, instr[258] specifies a branch to address 10, which is within the address space assigned to the instruction memory 132. To fill a gap prior to instr[258] taking effect, a delayed branching technique is implemented, such that instr [259] is addressed and read out. In addition, an input address is reset to address 10 substantially immediately upon instr [258] taking effect, and is held for 2 clock cycles. During an initial clock cycle, address 10 is effectively discarded since it lies outside of the address space assigned to the instruction memory 136. However, during a subsequent clock cycle, address 10 takes effect in connection with the instruction memory 132, such that instr[10] is addressed and read out.

TABLE 3

| Clock Cycle | Address In | Instruction Out |
|---|---|---|
| 0 | 0 | |
| 1 | 1 | instr[0] |
| 2 | 2 | instr[1] |
| 3 | 3 | instr[2] |
| 4 | 4 | instr[3] |
| 5 | 5 | instr[4] - branch to address 10 |
| 6 | 10 | instr[5] |
| 7 | 11 | instr[10] |
| 8 | $256_{RAM}12_{ROM}$ | instr[11] - branch to address 256 |
| 9 | 257 | instr[12] |
| 10 | 258 | instr[256] |
| 11 | 259 | instr[257] |
| 12 | 10 | instr[258] - branch to address 10 |
| 13 | 10 | instr[259] |
| 14 | 11 | instr[10] |
| 15 | 12 | instr[11] |
| 16 | | instr[12] |

It should be appreciated that the specific embodiments of the invention described above are provided by way of example, and various other embodiments are encompassed by the invention. For example, while some embodiments of the invention have been described with reference to a programmable clipping engine, it is contemplated that various types of micro-coded engines can similarly benefit from the programmability features described herein. In particular, with reference to FIG. 1, other types of micro-coded engines within the graphics pipeline 114 can be implemented in a similar manner as described herein.

Some embodiments of the invention relate to a computer storage product with a computer-readable medium having instructions or computer code thereon for performing various computer-implemented operations. The media and computer code may be those specially designed and constructed for the purposes of the invention, or they may be of the kind well known and available to those having skill in the computer software arts. Examples of computer-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; carrier wave signals; and hardware devices that are specially configured to store and execute program code, such as Application-Specific Integrated Circuits ("ASICs"), Programmable Logic Devices ("PLDs"), and ROM and RAM devices. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code.

Some embodiments of the invention can be implemented using computer code in place of, or in combination with, hardwired circuitry. For example, with reference to FIG. 1, various components of the graphics pipeline 114 can be implemented using computer code, hardwired circuitry, or a combination thereof.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process operation or operations, to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A graphics processing apparatus, comprising:
   a clipping unit;
   a read-only memory connected to the clipping unit, the read-only memory configured to store a clipping program;
   a read-write memory connected to the clipping unit, the read-write memory configured to store a patch program; and
   an addressing unit connected to the read-only memory and the read-write memory, the addressing unit configured to selectively address one of the read-only memory and the read-write memory based on a set of input conditions, wherein the set of input conditions are related to at least one of a set of characteristics of a graphics primitive to be clipped and a set of characteristics of a set of clipping planes associated with the graphics primitive to be clipped.

2. The graphics processing apparatus of claim 1, wherein the patch program is configured to replace at least a portion of the clipping program.

3. The graphics processing apparatus of claim 1, wherein the patch program is configured to add functionality to the clipping program.

4. The graphics processing apparatus of claim 1, wherein the addressing unit includes:
   a first entry point unit configured to issue a first entry point address into the read-only memory;
   a second entry point unit configured to issue a second entry point address into the read-write memory; and
   an address selector connected to the first entry point unit and the second entry point unit, the address selector configured to select one of the first entry point address and the second entry point address based on the set of input conditions.

5. The graphics processing apparatus of claim 1, wherein the addressing unit is configured to address the read-write memory based on the set of input conditions, such that the clipping unit executes the patch program in place of the clipping program.

6. The graphics processing apparatus of claim 1, wherein the addressing unit is configured to address the read-write memory based on the set of input conditions, such that the clipping unit executes the patch program in conjunction with the clipping program.

7. The graphics processing apparatus of claim 6, wherein the patch program specifies a branch to the clipping program.

8. The graphics processing apparatus of claim 7, wherein the addressing unit includes:
   a branching unit configured to coordinate branching between the clipping program and the patch program.

9. A graphics processing apparatus, comprising:
   a programmable clipping engine configured to clip a graphics primitive having either a first set of characteristics or a second set of characteristics, the programmable clipping engine including:
   a clipping unit;
   a first instruction memory connected to the clipping unit;
   a second instruction memory connected to the clipping unit, the second instruction memory being writable; and
   an addressing unit connected to the first instruction memory and the second instruction memory, such that if the graphics primitive has the first set of characteristics, then the addressing unit is configured to select the first instruction memory and if the graphics primitive has the second set of characteristics, then the addressing unit is configured to select the second instruction memory.

10. The graphics processing apparatus of claim 9, wherein the first instruction memory is configured to store a clipping program.

11. The graphics processing apparatus of claim 10, wherein the first instruction memory is a read-only memory.

12. The graphics processing apparatus of claim 10, wherein the second instruction memory is writable so as to store a patch program.

13. The graphics processing apparatus of claim 12, wherein the second instruction memory is a read-write memory.

14. The graphics processing apparatus of claim 12, wherein the patch program is written into the second instruction memory upon initialization of the programmable clipping engine.

15. The graphics processing apparatus of claim 12, wherein the addressing unit is configured to select between the clipping program and the patch program based on at least the first set of characteristics or the second set of characteristics of the graphics primitive.

16. The graphics processing apparatus of claim 12, wherein the addressing unit is configured to coordinate branching between the clipping program and the patch program.

17. A graphics processing method, comprising:
   providing a programmable clipping engine including a clipping unit, a read-only memory storing a first set of instructions, and a read-write memory storing a second set of instructions;
   based on a set of characteristics of a graphics primitive to be clipped, selecting the second set of instructions for execution by the clipping unit; and using the clipping unit, executing the second set of instructions to clip the graphics primitive.

18. The graphics processing method of claim 17, wherein the first set of instructions is related to a clipping program, and the second set of instructions is related to a patch program.

19. The graphics processing method of claim 17, further comprising:

writing the second set of instructions into the read-write memory prior to clipping the graphics primitive.

* * * * *